Feb. 22, 1955     C. D. NUGENT     2,702,638
RECHARGEABLE FILTER ELEMENT FOR PRESSURE FILTERS
Filed Aug. 9, 1952
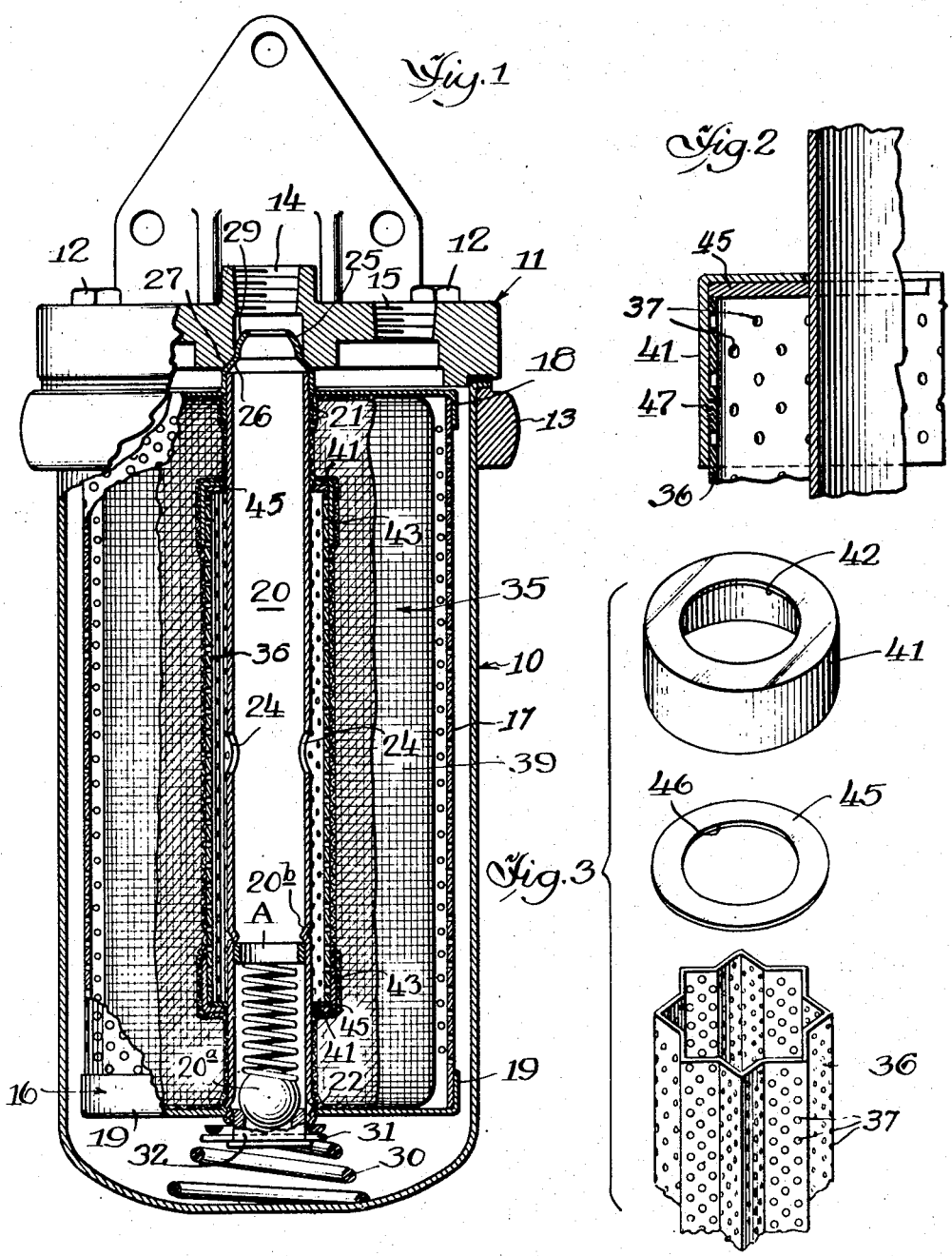
Inventor,
Corliss D. Nugent
By: Parker & Carter Attys

United States Patent Office 2,702,638
Patented Feb. 22, 1955

2,702,638

RECHARGEABLE FILTER ELEMENT FOR PRESSURE FILTERS

Corliss D. Nugent, Winnetka, Ill.

Application August 9, 1952, Serial No. 303,571

2 Claims. (Cl. 210—169)

This invention relates to improvements in rechargeable filter elements for pressure filters of the kind having a casing and a replaceable filter element through which the oil or other liquid is forced from an inlet, thence radially through the filter element, and thence out through an outlet.

More particularly, my invention is directed to the type of filter element broadly disclosed in my Patent No. 2,550,853, issued May 1, 1951, which consists generally of a cylindrical filter cartridge having a metallic core having longitudinally corrugated side walls and a substantially cylindrical body of filtering material surrounding the core and extending beyond the ends of the core. When in use, the type of cartridge above referred to is mounted in a filter casing with a central tube passing through the axial opening formed in the cartridge.

Among the objects of the present invention is to provide an improved form of core including end caps and gaskets at opposite ends thereof to prevent bypassing of liquid through the core, while increasing the filtering capacity of the filter element.

A further object of the invention is to provide means for reducing the amount of end pressure on the filter cartridge heretofore required when mounting it in the filter.

Other objects of the invention will appear from time to time as the following description proceeds.

The invention may best be understood by reference to the accompanying drawings, in which:

Figure 1 is a vertical section of a filter casing with a filter cartridge of my invention installed therein;

Figure 2 is an enlarged fragmentary detail of a portion of the core of the filter cartridge;

Figure 3 is an exploded detail view of the parts making up one end of the core shown in Figure 2.

Referring now to the embodiment of the invention illustrated in the drawings, 10 indicates a filter casing and 11 indicates a cover removably secured thereto by any well-known means, such as bolts 12, 12 engaged in enlarged portions of a ring 13 surrounding the casing. The cover 11 has a centrally disposed, threaded outlet port 14 and also a threaded inlet 15 to one side of the outlet port.

A cartridge holder 16 is removably mounted in the casing, in the form shown herein said cartridge holder consisting of cylindrical side walls 17, flanged top and bottom discs 18 and 19 and a tube 20 extending axially through central apertures 21 and 22 of top and bottom discs 18 and 19. The bottom end of the tube may be permanently secured by suitable means in the central aperture of the bottom disc 19, while the top disc 18 may be applied to the central tube 20 as a removable cover. The central tube 20 has two or more outlet ports 24, 24 therethrough, disposed about midway between its top and bottom ends.

A hollow nipple 25 is permanently mounted in the central aperture 21 of the top disc 18 to provide close fitting engagement with the upper end of central tube 20. Said nipple also has a reduced upper end portion 29 which fits in the lower end of the outlet port 14 in cover 11 of outer casing 10 when the parts are in assembled position, as shown in Figure 1.

A coil spring 30 is mounted on the lower end of the central tube 20, as herein shown being permanently connected to the latter by a cotter pin 31 passing through a hollow stud 32 fixed in the lower end of said tube and beneath the top coil of spring 30 so that the latter spring may be removed bodily with the cartridge holder when the latter is removed from the casing 10.

The hollow bushing 32 may also form the seat for a relief valve in tube 20 consisting of a ball 20a pressed by a coil spring having abutment at its upper end with a ring A suitably fixed within the tube 20 near its lower end as by an annular abutment 20b formed in the tube.

Referring now to the filter recharge cartridge forming the principal feature of my invention, the same is shown in detail in Figures 2 and 3 and consists of an elongated cylindrical filtering body 35 formed upon a hollow metallic core 36 which terminates a fairly short distance from each end of the cartridge. Said metallic core is made of sheet metal, with corrugations extending longitudinally thereof so as to form a substantially star-shaped pattern in cross section, as shown in Figure 3. The side walls of the corrugations have numerous small perforations 37, as shown in Figure 2, for passage of fluid therethrough.

The opposite ends of the core 36 have similar caps 41, 41 applied thereto, herein consisting of flanged metal discs, each having a central annular opening 42 of a diameter slightly larger than that of the outer diameter of the central tube 20 of the filter casing. The peripheral flange 43 of said discs are of substantial width, in which the peaks of the adjacent end of the corrugated metal core 36 are adapted to have close fitting engagement.

An annular, washer-shaped gasket 45 is disposed within each cap in engagement with the corrugations at the adjacent end of the core 36, said gasket having a central opening 46 normally of smaller diameter than the minimum inner diameter of the core, and adapted to fit in fluid tight relation against the central tube 20. In practice, the cap 41 is rigidly secured to the outer peaks of the corrugated core 36 as by one or more spot welds indicated at 47, to hold the gasket 45 permanently in place.

The filtering body of the cartridge 35 is formed around core 36 and extends somewhat beyond its capped ends. Said filtering body may consist of any suitable filtering material and is preferably enclosed in a fabric cover 39, such as knitted cloth or the like.

As will be apparent from Figure 1, when the parts of the filter are in fully assembled and operative position, the liquid circuit proceeds from the inlet 15 downwardly around the outer sides of the cartridge body 16, thence inwardly through the sides of said body into the hollow metal core 36, thence through the discharge ports 24, 24 in the outlet tube 20, and thence upwardly through the outlet 14 of the casing. As an alternative arrangement, the liquid circuit can, of course, be reversed if desired with the check valve 20b opening in the opposite direction.

The filter cartridge 35 is applied to the holder 16 so as to fit snugly and seal between the end plates or discs 18 and 19, and with the gaskets 45, 45 sealing the opposite ends of the core 36 in close-fitting engagement against the central discharge tube 20 of the holder 16.

In previous filter cartridges of this general type without any end sealing means for the core, it has been necessary to extend the end portions of filtering material considerably beyond the ends of the metal core, and then compress such end portions of filtering material inwardly into sealing engagement against the sides of the tube 20 by applying substantial endwise pressure on the discs 18 and 19. With such previous cartridges, it has been found by experience that, when the filter is mounted vertically as shown in Figure 1 on a machine or engine which vibrates considerably, the liquid is liable to be bypassed or leak along the central tube 20 into one end or the other end of the core 36, to mix with the filtered liquid. With my improved form of filter cartridge with caps 41, 41 and sealing gaskets 45 in tight-fitting engagement against the central tube 20, any bypassing or leakage along the tube 20 is effectively eliminated.

Moreover, by using the flanged caps and sealing gaskets as herein disclosed, no substantial end pressure is required on opposite end of the cartridge 35 when mounting it on its holder. In addition, the ends of the core can be extended considerably nearer to the ends of the cartridge, so as to increase the effective filtering action of the cartridge without increasing its length.

Although I have shown and described one embodiment of my invention, it will be understood that I do not wish to be limited to the exact construction shown and described, but that various changes and modifications may be made without departing from the spirit and scope of the invention as defined in the appended claims.

I claim:

1. In a filter cartridge for use in a pressure filter comprising a substantially cylindrical body of filtering material having an axial opening extending entirely therethrough and a central supporting tube slidably inserted longitudinally therein throughout the entire length of said axial opening, said tube being spaced from said opening intermediate the ends thereof defining a cylindrical shaped recess therebetween, a substantially rigid hollow core disposed in said recess, said core having perforated side walls corrugated longitudinally and open at opposite ends thereof, sealing means for both ends of said core disposed longitudinally inwardly and spaced from the end of said filtering body and embedded therein, said sealing means comprising annular gaskets each engaging and closing the corrugations at one of said open ends of said core and having a central aperture engaging said central supporting tube in liquid sealing relation, and a retaining cap fitting over each of said gaskets and the adjacent corrugated open end of said core with a flanged periphery extending longitudinally inwardly along the adjacent outer sides of said corrugated core, whereby said sealing means provides for the longitudinal extension of said core nearer the ends of the cylindrical body to increase the filtering action of the cartridge without increasing the length thereof and further during the assembly of said filter cartridge when said cylindrical body is slidably inserted on said supporting tube, said central aperture of said gaskets makes a liquid sealing contact with said tube without the application of any external force and said gaskets and caps provide protection of said cartridge filtering material from the corrugated walls of said core.

2. A filter cartridge construction in accordance with claim 1 wherein each of the peripheral flanges are permanently secured to the outer side of the core.

References Cited in the file of this patent
UNITED STATES PATENTS

| | | |
|---|---|---|
| 2,354,481 | Russell | July 25, 1944 |
| 2,524,336 | Vokes | Oct. 3, 1950 |
| 2,550,853 | Nugent | May 1, 1951 |